United States Patent
Hall et al.

(10) Patent No.: US 7,116,199 B2
(45) Date of Patent: Oct. 3, 2006

(54) INDUCTIVE COUPLER FOR DOWNHOLE COMPONENTS AND METHOD FOR MAKING SAME

(75) Inventors: David R. Hall, Provo, UT (US); H. Tracy Hall, Jr., Provo, UT (US); David S. Pixton, Lehi, UT (US); Scott Dahlgren, Provo, UT (US); Cameron Sneddon, Lombard, IL (US); Joe Fox, Spanish Fork, UT (US); Michael A. Briscoe, Lehi, UT (US)

(73) Assignee: IntelliServ, Inc., Provo, UT (US)

( * ) Notice: Subject to any disclaimer, the term of this patent is extended or adjusted under 35 U.S.C. 154(b) by 0 days.

(21) Appl. No.: 11/276,983

(22) Filed: Mar. 20, 2006

(65) Prior Publication Data

US 2006/0158296 A1   Jul. 20, 2006

Related U.S. Application Data

(60) Division of application No. 10/708,845, filed on Mar. 27, 2004, now Pat. No. 7,040,003, which is a continuation-in-part of application No. 10/707,234, filed on Nov. 29, 2003, now Pat. No. 6,992,554, which is a continuation-in-part of application No. 10/604,812, filed on Aug. 19, 2003, now Pat. No. 7,064,676, which is a continuation of application No. 09/816,766, filed on Mar. 23, 2001, now Pat. No. 6,670,880, which is a continuation-in-part of application No. 09/619,084, filed on Jul. 19, 2000, now abandoned.

(51) Int. Cl.
*H01F 27/02* (2006.01)

(52) U.S. Cl. .......................................... 336/90
(58) Field of Classification Search .................. 336/83, 336/84 R, 84 M, 84 C, 90, 107; 439/191–194; 285/328–333; 283/332.4; 29/602.1
See application file for complete search history.

(56) References Cited

U.S. PATENT DOCUMENTS

| | | | | |
|---|---|---|---|---|
| 6,830,467 B1 * | 12/2004 | Hall et al. | | 439/194 |
| 6,844,498 B1 * | 1/2005 | Hall et al. | | 174/75 C |
| 6,866,306 B1 * | 3/2005 | Boyle et al. | | 285/333 |
| 6,913,093 B1 * | 7/2005 | Hall et al. | | 175/57 |
| 6,929,493 B1 * | 8/2005 | Hall et al. | | 439/191 |
| 6,945,802 B1 * | 9/2005 | Hall et al. | | 439/194 |
| 6,992,554 B1 * | 1/2006 | Hall et al. | | 336/90 |
| 7,040,003 B1 * | 5/2006 | Hall et al. | | 29/602.1 |
| 7,064,676 B1 * | 6/2006 | Hall et al. | | 340/853.1 |

* cited by examiner

*Primary Examiner*—Tuyen T Nguyen
(74) *Attorney, Agent, or Firm*—Jeffery E. Daly; Tyson J. Wilde; Cameron Sneddon

(57) ABSTRACT

An inductive coupler for downhole components. The inductive coupler includes an annular housing having a recess defined by a bottom portion and two opposing side wall portions. At least one side wall portion includes a lip extending toward but not reaching the other side wall portion. A plurality of generally U-shaped MCEI segments, preferably comprised of ferrite, are disposed in the recess and aligned so as to form a circular trough. The coupler further includes a conductor disposed within the circular trough and a polymer filling spaces between the segments, the annular housing and the conductor.

26 Claims, 11 Drawing Sheets

INDUCTIVE COUPLER FOR DOWNHOLE COMPONENTS AND METHOD FOR MAKING SAME

CROSS-REFERENCE TO RELATED APPLICATIONS

The present application is a division of U.S. patent application Ser. No. 10/708,845 filed on Mar. 27, 2004 now U.S. Pat. No. 7,040,003 which is a continuation-in-part of U.S. patent application Ser. No. 10/707,234 filed on Nov. 29, 2003, now U.S. Pat. No. 6,992,554 which is a continuation-in-part of U.S. patent application Ser. No. 10/604,812 filed on Aug. 19, 2003, now U.S. Pat. No. 7,064,676, which application is, in turn, a continuation of U.S. patent application Ser. No. 09/816,766 filed on Mar. 23, 2001, now U.S. Pat. No. 6,670,880 which is, in turn, a continuation-in-part of U.S. patent application Ser. No. 09/619,084, filed Jul. 19, 2000, now abandoned. The entire disclosures of all of these related applications are incorporated herein by reference.

STATEMENT OF GOVERNMENT INTEREST

This invention was made with government support under Contract No. DE-FC26-01NT41229 awarded by the U.S. Department of Energy. The government has certain rights in the invention.

BACKGROUND OF THE INVENTION

This invention relates to oil and gas drilling and production, and more particularly to apparatus and methods for reliably transmitting information between downhole components.

For the past several decades, engineers have worked to develop apparatus and methods to effectively transmit information from components located downhole on oil and gas drilling strings to the ground's surface. Part of the difficulty comes from the fact that the operating environment for the transmission system can be extremely harsh, including temperatures as high as 200° C., pressures as high as 25,000 psi, and extremely abrasive and chemically corrosive conditions.

Another source of difficulty comes from the fact that a drill string is made up of hundreds of components, such as sections of drill pipe and various downhole tools. Thus, if the transmission system is integrated into each of these components, it must be capable of connections that can reliably transmit information across the joints between these hundreds of components.

Moreover, since these components are connected serially to create the drill string that may stretch for thousands of feet below the earth's surface, reliability is imperative. A failure in the transmission system of a single component can bring the whole system down and require an expensive "roundtrip" of the drill string to replace the defective component.

As an alternative to integrating a system into each of the drilling components, a transmission system has been developed known as mud pulse telemetry. Rather than using electrical connections, mud pulse telemetry transmits information in the form of pressure pulses through fluids circulating through a well bore. However, data rates of mud pulse telemetry are very slow compared to data rates needed to provide real-time data from downhole components. For example, mud pulse telemetry systems often operate at data rates less than 10 bits per second. At this rate, the low data resolution can prevent a driller from making decisions in real time. Since drilling equipment is often rented and very expensive, even slight mistakes can incur substantial expense. Part of the expense can be attributed to time-consuming operations that are required to retrieve downhole data or to verify low-resolution data transmitted to the surface by mud pulse telemetry. Often, drilling or other procedures are halted while data is gathered.

Since direct electrical connections between drill string components may be impractical and unreliable, converting electrical signals to magnetic fields for conversion back to electrical signals offers one solution for transmitting information between drill string components. One such system is disclosed in U.S. Pat. No. 6,670,880. These types of elements are referred to as inductive couplers. An inductive coupler functions by converting electrical signals to magnetic fields for transmission across the tool joint. A corresponding inductive coupler located on the next downhole component converts the magnetic field back to an electrical signal where it may be transmitted along the drill string.

BRIEF SUMMARY OF THE INVENTION

The present invention includes a method of making an inductive coupler for downhole components. The method includes providing an annular housing, preferably made of steel, the housing having a recess. A conductor, preferably an insulated wire is also provided along with a plurality of generally U-shaped magnetically conducting, electrically insulating (MCEI) segments. Preferably, the MCEI segments comprise ferrite. An assembly is formed by placing the plurality of MCEI segments within the recess in the annular housing. The segments are aligned to form a generally circular trough. A first portion of the conductor is placed within the circular trough. This assembly is consolidated with a meltable polymer, such as a fluoropolymer, to thereby fill spaces between the segments, annular housing and the first portion of the conductor.

The invention also includes an inductive coupler including an annular housing having a recess defined by a bottom portion and two opposing side wall portions. At least one side wall portion includes a lip extending toward but not reaching the other side wall portion. A plurality of generally U-shaped MCEI segments, preferably comprised of ferrite, are disposed in the recess and aligned so as to form a circular trough. The coupler further includes a conductor disposed within the circular trough and a polymer filling spaces between the segments, the annular housing and the conductor.

It should be noted that, as used herein, the term "downhole" is intended to have a relatively broad meaning, including such environments as drilling in oil and gas, gas and geothermal exploration, the systems of casings and other equipment used in oil, gas and geothermal production.

It should also be noted that the term "transmission" as used in connection with the phrase data transmission or the like, is intended to have a relatively broad meaning, referring to the passage of signals in at least one direction from one point to another.

It should further be noted that the term "magnetically conductive" refers to a material having a magnetic permeability greater than that of air.

It should further be noted that the term "electrically insulating" means having a high electrical resistivity, preferably greater than that of steel.

It should be noted that the term "U-shaped" is intended to have a relatively broad meaning. When used in connection with the MCEI segments, it means that each segment has a bottom portion, and two side portions with a trough formed therebetween. Consequently, the cross-section and end view appear generally U-shaped. Likewise, it should be noted that, in this context, the term "bottom" refers to the portion of the segment that is away from the opening of the trough. As depicted, that portion is on the bottom. Nevertheless, in use, that portion may actually be above the opening in the trough.

It should be further noted that the term "adhere" is intended to have a relatively broad meaning. When used in connection with the polymer, it means that the polymer holds onto, sticks, fuses, or even chemically bonds to an object.

BRIEF DESCRIPTION OF THE DRAWINGS

The foregoing and other features of the present invention will become more fully apparent from the following description, taken in conjunction with the accompanying drawings. The invention will be described with additional specificity and detail through use of the accompanying drawings with the understanding that these drawings depict only typical embodiments in accordance with the invention and are therefore not to be considered limiting in scope.

DETAILED DESCRIPTION OF THE INVENTION AND THE PREFERRED EMBODIMENTS

It will be readily understood that the components of the present invention, as generally described and illustrated in the Figures herein, may be arranged and designed in a wide variety of different configurations. Thus, the following detailed description of embodiments of the present invention, as represented in the figures, is not intended to limit the scope of the invention but is merely representative of various selected embodiments of the invention. The embodiments of the invention will be best understood by reference to the drawings wherein like parts are designated by like numerals throughout.

An apparatus is disclosed in one embodiment of the present invention as including an inductive coupler mountable proximate a mating surface of a downhole drilling component, such as a section of drill pipe.

By "mating surface," it is meant a surface on a downhole component intended to contact or nearly contact the surface of another downhole component, such as another section of drill pipe. For example, a mating surface can include threaded regions of a box end or pin end of drill pipe, primary or secondary shoulders designed to come into contact with one another, or other surfaces of downhole components that are intended to contact or come into close proximity to surfaces of other downhole components.

Figure 1:
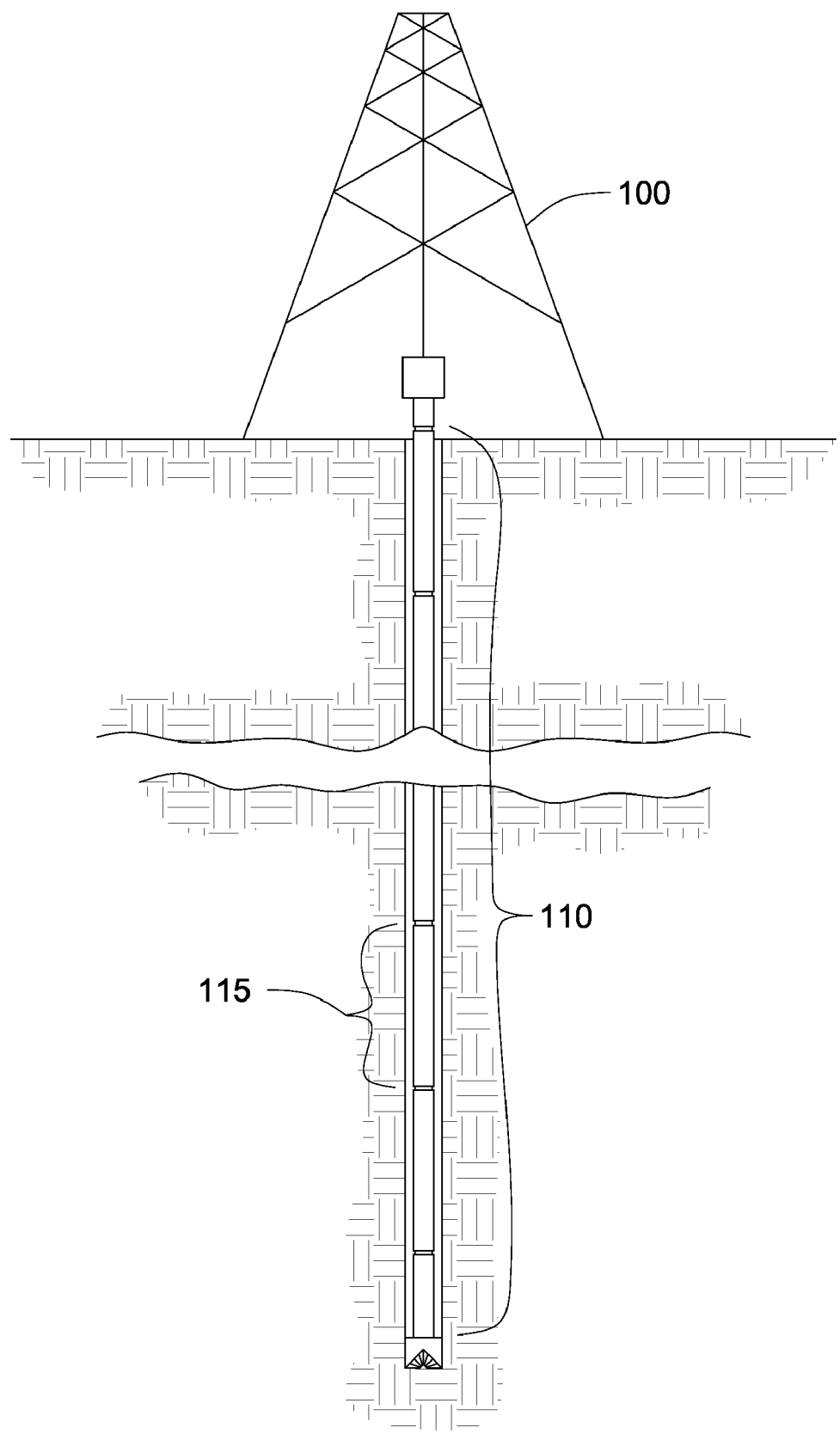
FIG. 1 is a schematic representation of a drill string as used on a drilling rig.

Referring to the drawings, FIG. 1 is a schematic representation of a drillstring 110 in a borehole as used on a drilling rig 100 including downhole components 115. Some examples of downhole components are drill collars, jars, heavy weight drill pipe, drill bits, and of course drill pipe.

Figure 2:
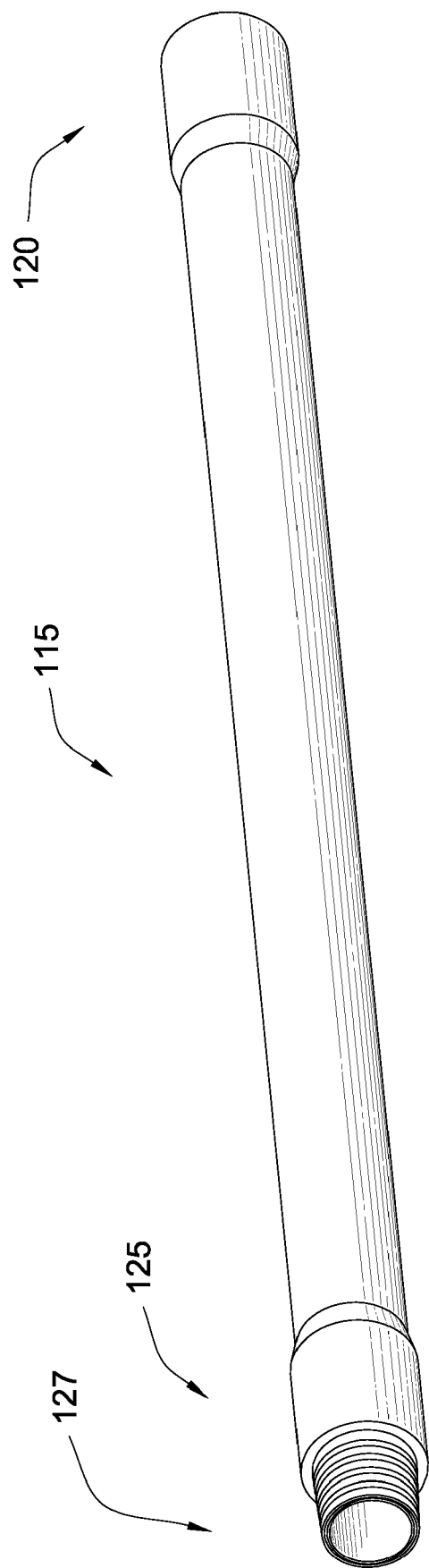
FIG. 2 is a perspective view of a drill pipe.

FIG. 2 shows one example of a downhole component, a drill pipe 115 including a box end tool joint 120, and pin end tool joint 125 and pin nose 127. Tool joints are attached to the component and provide threads or other devices for attaching the tools together, and to allow a high torque to be applied to resist the forces present when making up a drill string or during drilling. Between the pin end 125 and box end 120 is the body of the drill pipe section. A typical length of the body is between 10 and 90 feet. Drill strings in oil and gas production can extend as long as 20,000 feet, which means that as many as 700 sections of drill pipe and downhole components can be used in the drill string.

Figure 3:
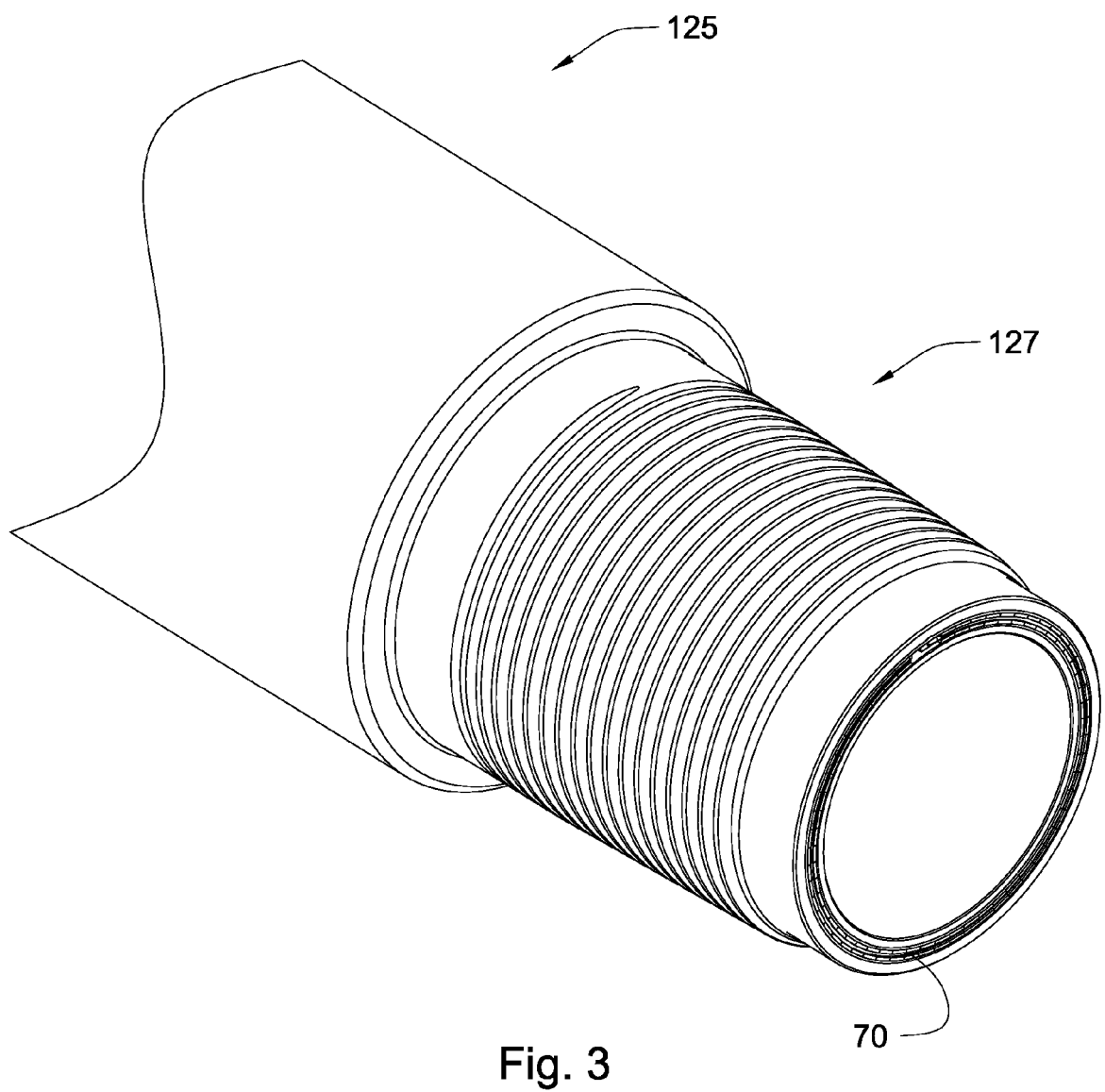
FIG. 3 is a close up view of the pin nose of the pin end tool joint of FIG. 2 illustrating the inductive coupler retained within the pin end tool joint.

A close up of pin end tool joint 125 is shown in FIG. 3. A coaxial cable is disposed within the drill pipe running along the longitudinal axis of the drill pipe 115. The coaxial cable includes a conductive tube and a conductive core within it (not shown). An inductive coupler 70 is disposed in the pin nose 127 of pipe 115. A close up (not shown) of the box end 120 of pipe 115 would depict a similar placement of the inductive coupler, i.e. in a recess formed in the internal shoulder of the box end.

In one embodiment of the invention, an inductive coupler is configured to communicate with a corresponding inductive coupler located on another downhole component. The corresponding inductive coupler can likewise be mountable proximate a mating surface of the corresponding downhole component. In order to close gaps present between communicating surfaces of inductive couplers, inductive couplers are preferably biased with respect to the mating surfaces they are mounted on.

By "biased," it is meant, for the purposes of this specification and the appended claims, that an inductive coupler is urged, by a biasing member, such as a spring or an elastomeric material, or by a "spring force" caused by contact between an inductive coupler and a mating surface, in a direction substantially orthogonal to the mating surface. Thus, the term "biased" is not intended to denote a physical position of an inductive coupler with respect to a mating surface, but rather the condition of an inductive coupler being urged in a selected direction with respect to the mating surface. In selected embodiments, the inductive coupler can be positioned flush with, above, or below the mating surface. The inductive couplers are preferably biased in both the pin ends and box ends though the inductive coupler may also be biased in only one end of a drilling component and not the other.

In another embodiment of the present invention, a mating surface is shaped to include a recess. An inductive coupler is mounted or housed within the recess. In selected embodiments, a recess includes a locking mechanism to retain the inductive coupler within the recess. In certain embodiments, the locking mechanism is a locking shoulder shaped into the recess. An inductive coupler, once inserted into the recess, slips past and is retained by the locking shoulder. The generally U-shaped annular housing is formed such that it is mountable in a recess of a mating surface of a downhole component. The U-shaped annular housing may be flush with the mating surface, below the mating surface, above the mating surface, or a combination thereof.

In a preferred embodiment the drill pipe will include tool joints as depicted in FIG. 2. However, a drill pipe without a tool joint can also be modified to house the coaxial cable and inductive coupler. Thus tool joints are not necessary for the invention. The coaxial cable and inductive coupler may be disposed in other downhole components such drill collars, jars, and similar components that would be typically found in a drill string. Additionally the coaxial cable may be disposed within other downhole components used in oil and gas or geothermal exploration through which it would be advantageous to transmit an electrical signal and thus necessitate a inductive coupler.

The conductive tube is preferably made of metal, more preferably a strong metal, most preferably steel. By "strong metal" it is meant that the metal is relatively resistant to deformation in its normal use state. The metal is preferably stainless steel, most preferably 316 or 316L stainless steel. A preferred supplier of such stainless steel is Plymouth Tube, Salisbury, Md.

In an alternative embodiment, the conductive tube may be insulated from the pipe in order to prevent possible galvanic corrosion. At present, the preferred material with which to insulate the conductive tube is PEEK®, such as that provided by Victrex, having U.S. offices in Greenville, S.C.

As described in related U.S. Pat. No. 6,670,880, the inductive coupler 70 converts an electrical signal to a magnetic field or magnetic current. A corresponding inductive coupler (not shown) in the box end 120 located proximate the inductive coupler 70 when the box end and pin end are connected together, detects the magnetic field or current. The magnetic field induces an electrical current into the box end inductive coupler that is transmitted to the coaxial cable located along the drill pipe 115 or other downhole component.

Figure 4:
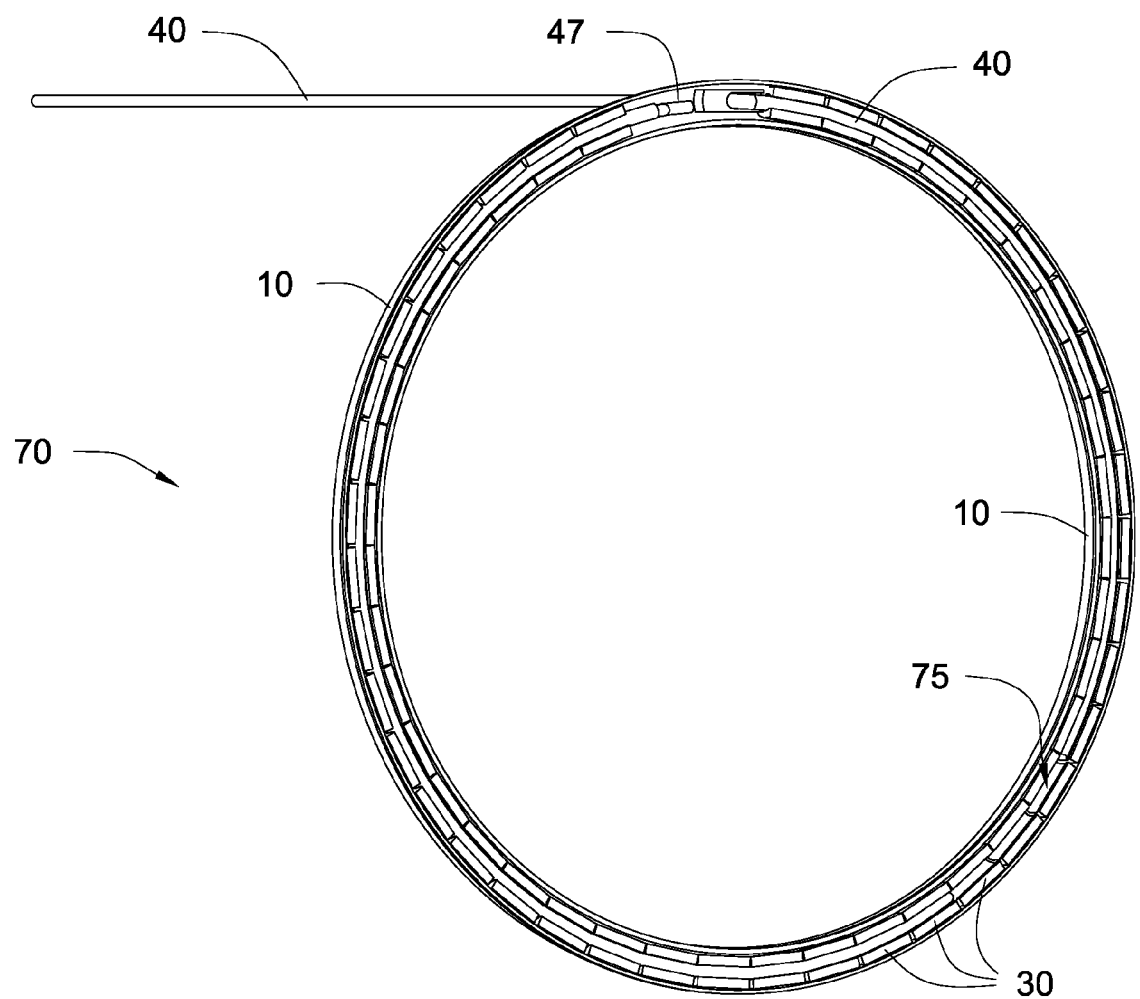
FIG. 4 is a perspective view illustrating the inductive coupler removed from the drill pipe.

Referring to FIG. 4, an inductive coupler 70 includes a generally U-shaped annular housing 10. A plurality of magnetically conducting, electrically insulating (MCEI) segments 30, such as ferrite or some other material of similar electrical and magnetic properties, are disposed within the annular housing 10. The MCEI segments are aligned to form a generally circular trough 75 shown by removing a section of a conductor, preferably an insulated wire 40, whereas the insulated wire is normally disposed all the way around and in the trough 75. As is shown in FIG. 4, a plurality of MCEI segments are employed for durability purposes while in use during downhole operation. Since materials such as ferrite may be quite brittle, they are preferably provided in segments to prevent cracking or breakage that might otherwise occur using a single piece of ferrite. A conductor, preferably an insulated wire 40 is disposed within the circular trough 75. The insulated wire 40 is electrically connected at an end 47 to the annular housing 10 forming an attachment. The attachment provides for the insulated wire and annular housing to be in electrical communication with each other. The insulated wire may be welded to the annular housing, or more preferably, brazed to the annular housing. The MCEI segment 30 is formed in a U-shape and fits within the housing 10. The annular housing preferably includes at least one substantially U-shaped segment disposed within the annular housing and most preferably with a plurality of U-shaped segments. The U-shaped segment is preferably composed of a magnetically conductive and electrically insulating material, such as ferrite, thereby enabling magnetic current to be propagated therein and channeled in a desired direction.

An electrical conductor is disposed within the U-shaped segment to carry electrical current. The electrical conductor is electrically insulated to prevent shorting of the conductor to other electrically conductive components.

The MCEI segments are preferably made from a single material, which in and of itself has the properties of being magnetically conductive and electrically insulating. A particularly preferred material is ferrite. Most preferably, the ferrite is one commercially available from National Magnetics Group, Bethlehem, Pa., grade G4, having a magnetic permeability of about 400. There are a number of other manufacturers that provide commercial products having a corresponding grade and permeability albeit under different designations.

As an alternative to using a single material that is both magnetically conductive and electrically insulating, the MCEI segments can be made from a combination of materials selected and configured to give these properties to the element as a whole. For example, each segment can be made from a matrix of particles of one material that is magnetically conductive and particles of another material that is electrically insulating, wherein the matrix is designed so as to prevent the conduction of electrical currents, while promoting the conduction of a magnetic current. One such material, composed of ferromagnetic metal particles molded in a polymer matrix, is known in the art as "powdered iron."

Also, instead of a matrix, the MCEI segments may be formed from laminations of materials such as a silicon transformer steel separated by an electrically insulating material, such as a ceramic, mineral (mica), or a polymer. Because the induced electric field is always perpendicular to the magnetic field, the chief requirement for the MCEI segment is that the magnetic field be accommodated in a direction that wraps around the conductor, whereas electrical conduction should be blocked in the circumferential direction, perpendicular to the magnetic field and parallel to the conductor.

The annular housing 10 is preferably constructed of a hard material that is electrically conductive such as certain metals. The metals may be steel, titanium, chrome, nickel, aluminum, iron, copper, tin, and lead, as well as alloys thereof. The various types of steel employed may be viscount 44, D2, stainless steel, tool steel, and 4100 series steels. Stainless steel such as 17-4 however is the most preferable material out of which to construct the annular housing. Stainless steel provides for ample corrosion resistance thus increasing the life of the inductive coupler while in a highly corrosive environment such as downhole drilling.

As current flows through the insulated wire 40, a magnetic field is created around the insulated wire 40. The U-shaped MCEI segments 30 serve to contain the magnetic flux created by the conductor 40 and prevent energy leakage into surrounding materials. The U-shape of the segment 30 also serves to transfer magnetic current to a similarly shaped segment 30 in another inductive coupler.

Figure 5:
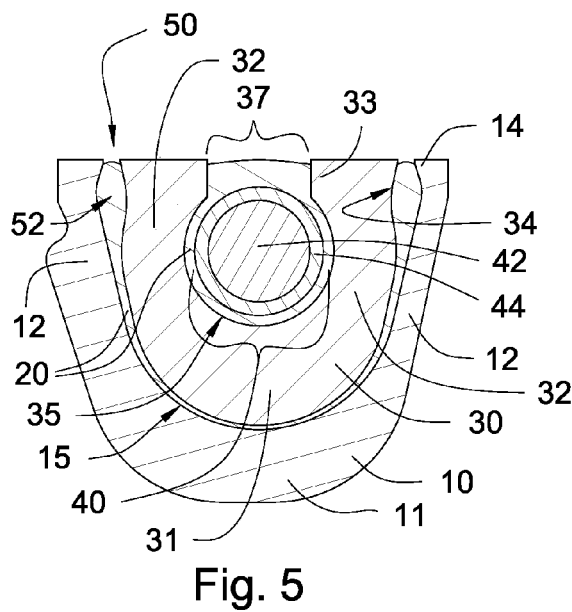
FIG. 5 is a cross-sectional side view of the inductive coupler illustrating the placement of the MCEI segment, insulated wire, and polymer matrix, within the U-shaped annular housing.
Figure 6:
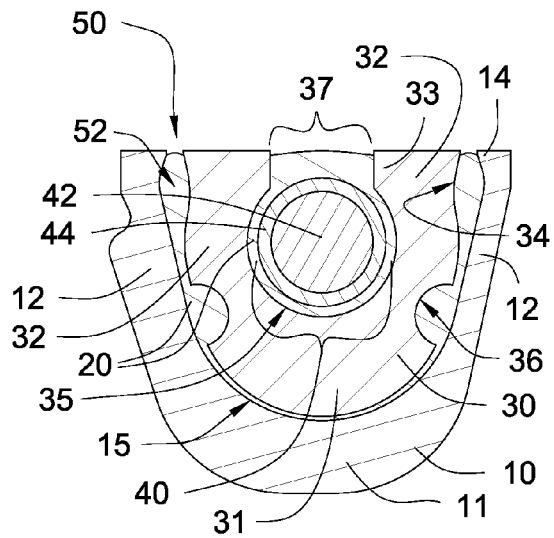
FIG. 6 depicts another embodiment of the present invention having a plurality of recesses formed on the MCEI segment outer side wall.
Figure 7:
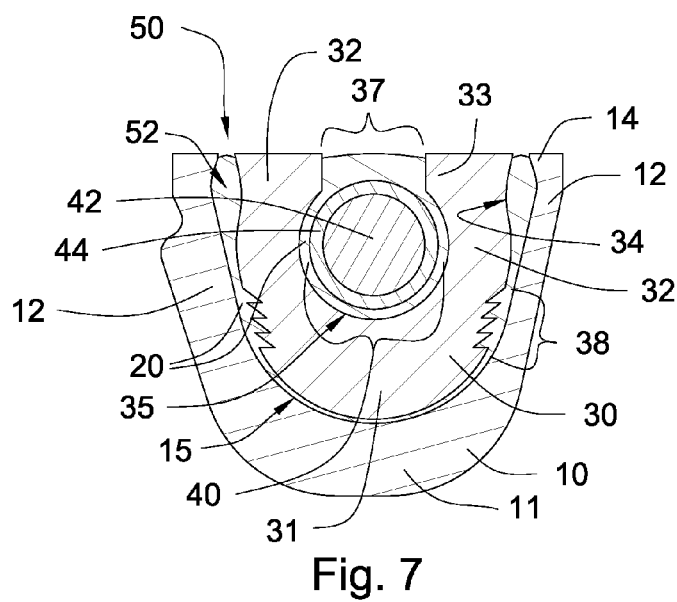
FIG. 7 depicts another embodiment of the present invention with a plurality of recesses forming barbs.

Turning now to FIGS. 5–7, FIG. 5 is a cross section of the most preferred embodiment of the inductive coupler 70 as shown in FIG. 4. A generally U-shaped annular housing 10 forms the "backbone" of the inductive coupler. The annular housing forms a recess 15 defined by a bottom portion 11 and two opposing side wall portions 12 thus giving it a generally U-shape. At least one of the opposing side wall portions comprises a lip 14 extending toward, but not reaching the other side wall portion. A plurality generally U-shaped MCEI segments 30 are disposed within the annular housing 10 though the cross section of only one such segment is shown here. The U-shaped MCEI segment comprises a bottom portion 31 and two opposing side portions 32 which portions together form a trough 35. At least one of the side portions includes at least one groove 34 in its surface opposite the trough 35. In the most preferred embodiment, each of the two side portions 32 comprise an overhang 33 extending toward but not reaching the other side portion.

The MCEI segments 30 are aligned in the recess 15 to form a gap 50 between the segments and the lip 14. A pocket 52 formed between the groove 34 and the annular housing 10 is wider than the gap 50. The formed pocket 52 needs to be wider than the gap 50 for reasons that will be discussed below.

Within the circular trough 75 formed by aligning the plurality of U-shaped MCEI segment 30, a conductor, preferably an insulated wire 40 is provided to carry electrical current therethrough. The wire 42 of the insulated wire 40 is insulated with an electrically insulating polymer 44. The overhang 33 serves to retain the insulated wire 40 within the MCEI segment 30. Preferably the trough 35 has an opening 37 that is narrower than the diameter of the conductor such as an insulated wire 40 as shown.

In a preferred embodiment, the most preferable type of conductor material is a nickel plated copper clad stainless steel wire. The stainless steel core imparts strength to the insulated wire and corrosion resistance. Copper is preferred for good conductivity and nickel for the ability to bond with polymers which form the insulating material. Alternative materials for the conductor are copper, copper clad steel, copper clad stainless steel, silver plated copperclad steel, silver plated copper clad stainless steel and nickel plated copper clad steel. A preferred supplier of copperclad steel and stainless steel wires is Copperweld, Fayetteville, Tenn. A preferred silver or nickel plater is Phelps Dodge Wire and Cable, Inman, S.C.

A polymer 20 fills spaces within the recess 15, and between the MCEI segments 30, and the insulated wire 40, including the gap 50 and pocket 52, such that the lip 14 functions to retain the MCEI elements within the recess. The polymer forms a bulbous region the width thereof matching the pocket width. The polymer bulbous region is therefore wider than the gap 50 and cannot move past the gap 50 and therefore keys the MCEI segment in place similar to a cotter. Thus, the MCEI segments 30 cannot be removed from the annular housing 10, except by destroying the MCEI segments and thus the inductive coupler, in the process of extraction. Filling the spaces between the insulating wire 40 and the MCEI segment 30 with a polymer further enhances the retention of the conductor within the MCEI segment. Furthermore, the polymer forms a key on top of the insulating conductor thereby not allowing any twisting of the insulated wire within the MCEI segment.

It is desirable for the polymer to adhere to the annular housing and the conductor but not the MCEI segments. When a drilling component goes deeper into a borehole, the surroundings become naturally hotter, thus thermal expansion of materials within the inductive coupler becomes problematic, particularly if some of the components are fragile. The MCEI segments, which are preferably constructed of ferrite, maybe just such a fragile component. If the polymer adhered tightly or chemically bonded to the MCEI segments, upon expansion of the polymer, annular housing, and insulated wire, the MCEI could fissure, and could even break. If an MCEI segments such as ferrite breaks, it may lose its inherent ability to be magnetically conductive, thus decreasing overall efficiency of the inductive coupler. If enough damage is done, the coupler may be rendered inoperative. Thus, in the most preferred embodiment where the polymer does not adhere to the MCEI segments, the MCEI segments remain stable, intact, and in place even when the annular housing, polymer, and insulated wire thermally expand.

This same feature is also beneficial for the biased inductive coupler as discussed above. By stretching the annular housing as it is forced into the recess within the mating surface of a downhole component, the pliant characteristic of the polymer allows it to stretch along with the annular housing, but without pulling apart the MCEI segments.

Various types of polymers can be employed as the "filler material" for the inductive coupler such as polyether ether ketone or PEEK and polyether ketone ketone or PEKK. A thermoplastic material is desirable for its processability characteristics as well as a fluoropolymer type material for its unreactivity to many chemicals. Teflon® is one such type of thermoplastic fluoropolymer. Various types of fluoropolymers are available such as perfluoroalkoxy copolymer or PFA, fluorinated ethylene propylene or FEP, ethylene-tetrafluoroethylene or ETFE, amorphous fluoropolymer or AF, polytetrafluoroethylene or PTFE, and ethylene-chlorotrifluoroethylene copolymer or ECTFE. ECTFE is also known as Halar. These materials also have desirable mechanical and electrical properties excellent for use within the inductive coupler. Teflon® is well known as a dielectric which is often used in the production of coaxial cables.

These same materials can form the electrically insulating polymer that is bonded to the wire of the insulated wire housed within the MCEI segment. The most preferable insulating material and polymer filler is PFA and FEP respectively. The respective melting point of PFA and FEP, with PFA higher than FEP, allows for feasible processability of the inductive coupler. The PFA is bonded or coated onto the wire, forming the insulated wire, prior to assembly of the inductive coupler. When the annular housing, insulated wire, and MCEI segments are assembled and filled with FEP, the temperature necessary for the processing of the FEP will not spoil the integrity of the PFA on the wire, thus ensuring proper insulation. This principle may be used with other thermoplastics besides just PFA and FEP as long as the insulating material melting temperature is sufficiently higher than the filler polymer melting temperature to ensure proper insulation of the wire.

Referring to FIG. 6, the MCEI segments 30 may also contain a plurality of grooves 36. By including more than one groove, the mechanical retention of the MCEI segments 30 within the annular housing 10 is strengthened. The other features of the inductive coupler as previously described are also shown in FIGS. 6 and 7. Another embodiment of the MCEI segments 30 is shown in FIG. 7. The plurality of grooves on MCEI segments 30 may also act as barbs 38 to retain the segments within the annular housing. This feature makes it especially difficult to forcibly extract the MCEI segments or for it to delaminate from the annular housing 10.

Another aspect of the invention is a method of creating the inductive coupler. The method includes providing an annular housing, preferably made of steel, the housing having a recess. A conductor, preferably an insulated wire, is also provided along with a plurality of generally U-shaped magnetically conducting, electrically insulating (MCEI) segments. Preferably, the MCEI segments comprise ferrite. An assembly is formed by placing the plurality of MCEI segments within the recess in the annular housing. The segments are aligned to form a generally circular trough. A first portion of the conductor is placed within the circular trough. This assembly is consolidated with a meltable polymer to thereby fill spaces between the segments, annular housing and the first portion of the conductor. In a preferred embodiment a meltable polymer liner may be located in the recess of the annular housing followed by placing a plurality of MCEI segments on top of the liner wherein said segments form a circular trough. A first portion of an insulated wire is placed in the circular trough followed by a circular, meltable polymer cap on top of the MCEI segments. Preferably, a protrusion located on the circular, meltable polymer cap fits within the trough. The foregoing assembly is consolidated by applying sufficient heat to at least partially melt the liner and cap, to thereby fill spaces between the segments, annular housing and the first portion of the insulated wire.

Turning now to FIGS. 8–11, shown in greater detail is the method of constructing an inductive coupler as described above.

Figure 8:
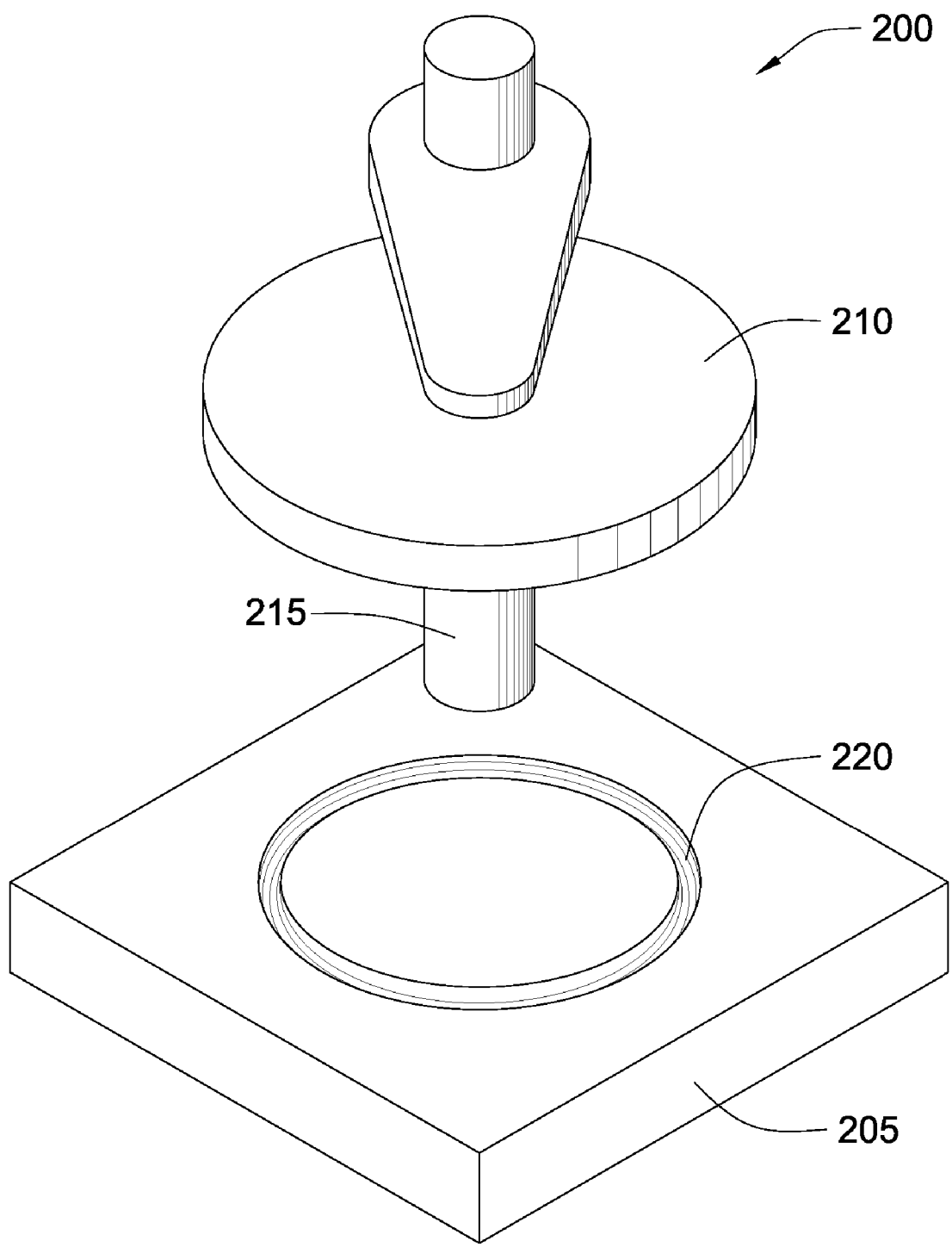
FIG. 8 is a perspective view depicting a thermal press.
Figure 9:
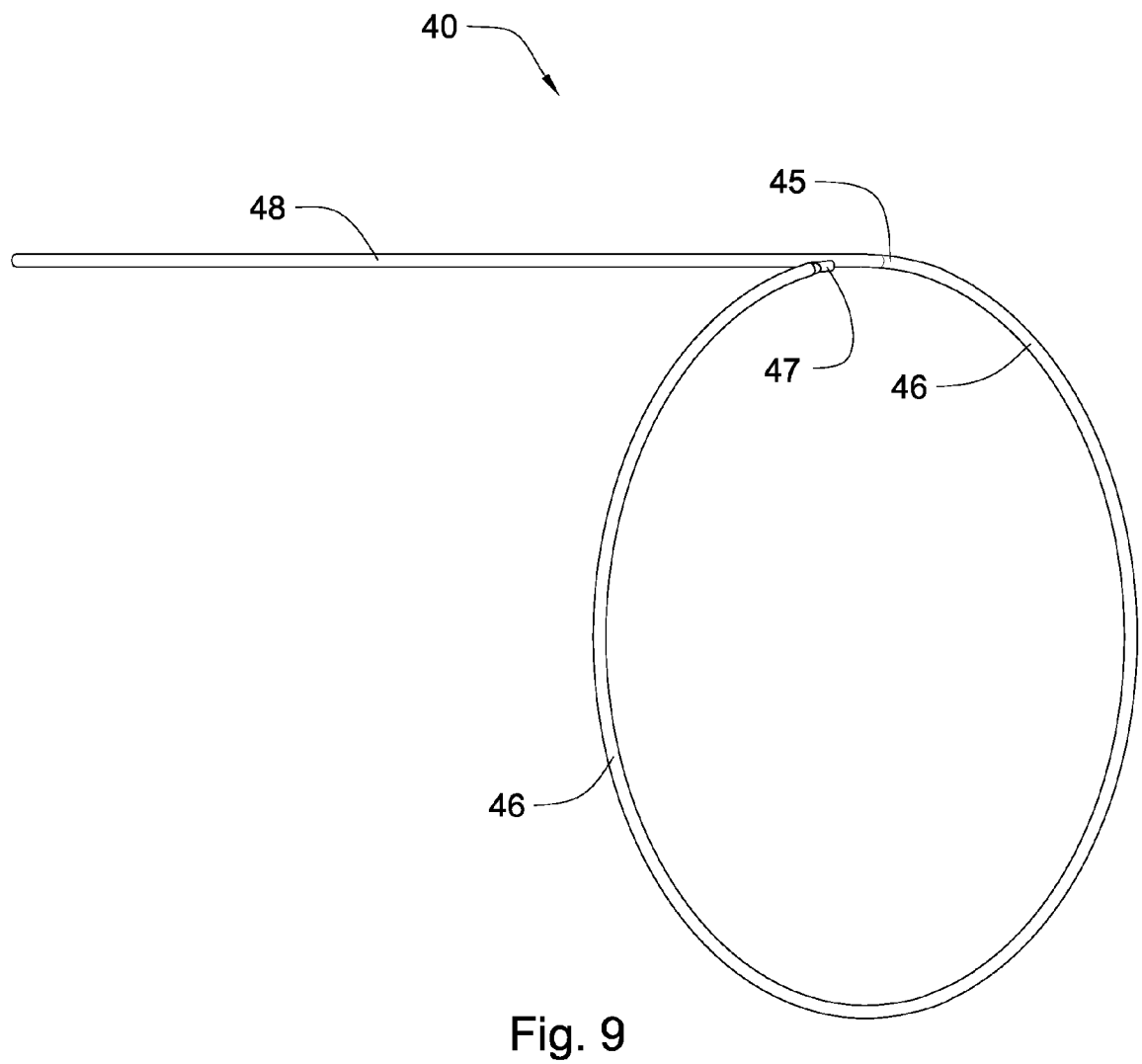
FIG. 9 is a perspective view of the insulated wire.

FIG. 8 is a perspective view of a thermal press, one means of consolidating the assembly. The drawing depicts the major design aspects for the thermal press and not necessarily to any specific embodiment. A thermal press 200 is used to consolidate an assembly forming an inductive coupler. A base 205 has an annular groove 220 used to contain the final assembly of the inductive coupler prior to the consolidation cycle. In the most preferred embodiment, the annular groove shape will substantially conform to the annular housing outer wall shape to provide for the most efficient heat transfer during the thermal cycle process thus decreasing the cycle times. A means is provided for heating the base 205, the annular groove 220, and subsequently the assembly forming the inductive coupler. An arm 215 having a disc 210 is used to press the components of the inductive coupler together during the heating cycle. The arm comes down thereby placing the disc on top of the assembly and creating a pressure load on the assembly while heating the components. The thermal press operating temperature should correspond with the chosen polymer and its thermal-physical properties and ensure that the polymer at least partially melts preferably infusing into the assembly. Temperatures in the range of about 250° C. to 450° C. are possible with about 330° C. the most desirable during the consolidating step. The pressure required to push the components together during the thermal heating of the components can be between about 20 psi and 150 psi. The optimal amount for the current design is about 100 psi with a cycle time of 10–15 minutes. The thermal press step forces the components to come together and consolidates the assembly with melted polymer thereby filling the spaces between the segments, annular housing and the first portion of the conductor as will be discussed below. FIG. 9 shows a perspective view of the insulated wire 40 as used to create an inductive coupler. The insulated wire 40 includes a first portion 46 generally normal at the bend 45 to a second portion 48.

Figure 10:
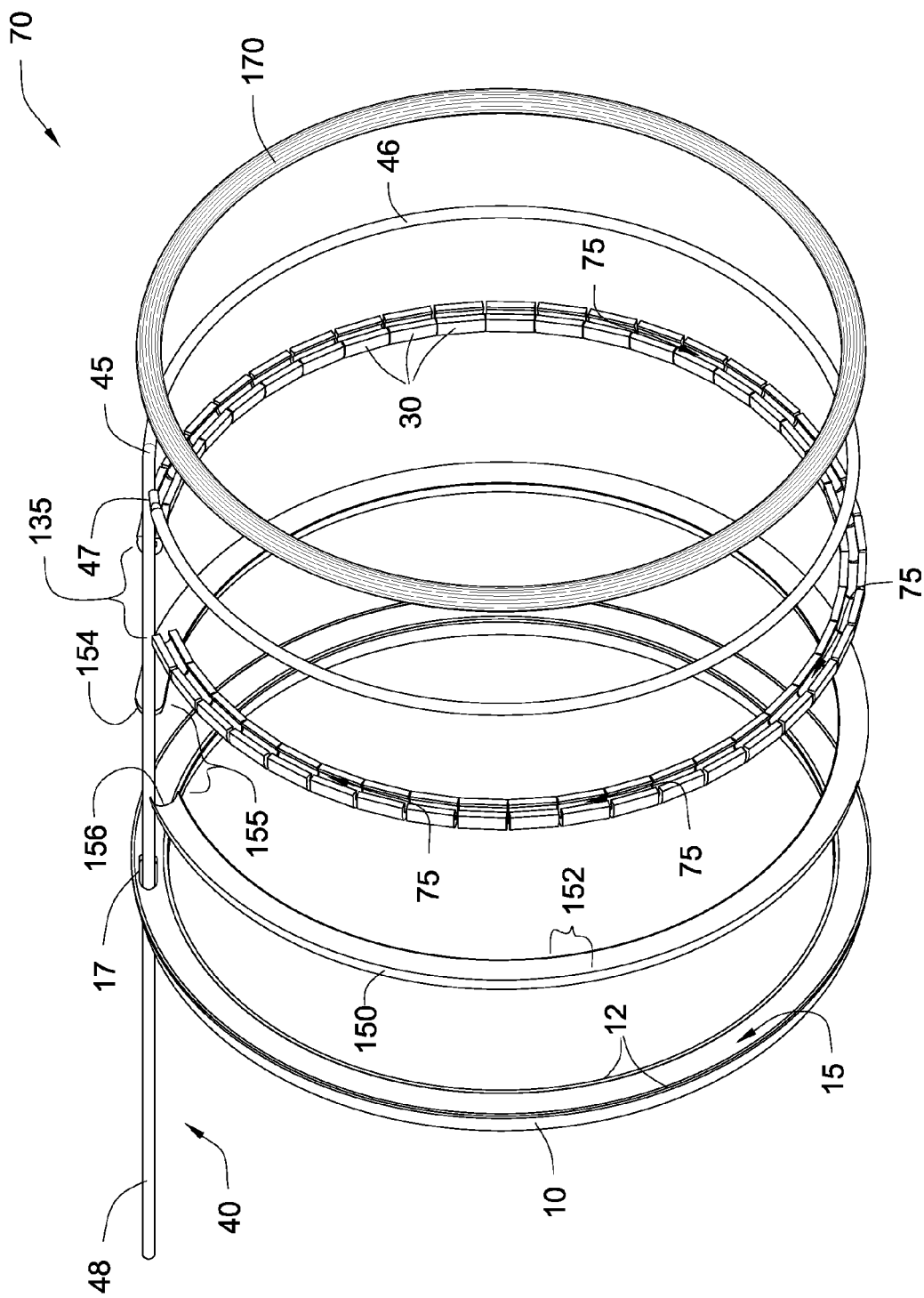
FIG. 10 is an exploded view of the various components used to create the inductive coupler and how they fit together.

Prior to the heat and pressure cycle in the production process, the inductive coupler components are assembled together. FIG. 10 is an exploded view of the components used to produce the inductive coupler 70 and will be used to discuss the methods of assembling the same. The primary components, a generally U-shaped annular housing 10, a plurality of generally U-shaped MCEI segments 30, and a conductor such as an insulated wire 40 are provided and form an assembly which will then be consolidated with a melted polymer. A generally U-shaped annular housing 10 forms the "backbone" of the inductive coupler. The annular housing 10 defines an opening 17 therethrough which communicates with the recess 15. In one embodiment a bridge (not shown) formed in a T-shape with a through hole can be placed in the opening 17. The bridge helps support the generally normal bend 45 in the insulated wire 40 when such a need is deemed appropriate.

Next, a meltable polymer liner 150 is placed in the recess 15. In a preferred embodiment the meltable polymer liner is generally U-shaped with an open end 152. A first end 154 and second end 156 of the annular liner 150 form a gap 155 adjacent the opening 17 through the annular housing 10. The MCEI segments 30 are arranged so as to provide a gap 135 therebetween adjacent the opening and placed on top of the annular liner so as not to interfere with the gap 155. Furthermore the MCEI segments are aligned to form a generally circular trough 75.

A conductor such as an insulated wire 40 comprises a first portion 46 and a second portion 48. The first portion 46 is generally normal at a bend 45 to the second portion 48. The conductor first portion 46 is placed within the circular trough 75 formed by the aligned MCEI segments 30 with the second portion 48 extending through the gap 155 and passing through the opening 17 of the annular housing 10. In the most preferred embodiment, the shape of the MCEI segments will require prior stringing of the MCEI segments 30 on the conductive loop 46 thus creating a sub-assembly. Such a shape is discussed above. In this situation, the MCEI segments 30, first portion 46, and second portion 48 are placed as a sub-assembly within the annular housing 10 and on top of the meltable polymer liner 150 in one step.

An end 47 of the first portion 46 is preferably electrically connected to the annular housing 10 forming an attachment. This is preferably accomplished by welding the housing and end together. Another method of attachment is brazing the end to the housing or even a combination of the two. Additionally, the means of electrically connecting the two may employ any method so long as it places the end in electrical communication with the annular housing.

Following the electrical connection step of the assembly process, a generally circular, meltable polymer cap 170 preferably with a protrusion (not shown) is placed adjacent the circular trough 75 formed by the plurality of MCEI segments 30 such that the protrusion fits within the trough and preferably rests on top of the insulated conductor. This feature will be shown in greater detail in subsequent drawings.

The assembly is then placed in a thermal press such as that depicted in FIG. 8 and heated to a sufficient temperature to at least partially melt the cap and liner together, thereby consolidating the inductive coupler. Preferably, the amount of polymer in the liner and cap, the heat and the pressure are all selected so as to ensure that all spaces between the segments, the annular housing and the conductor are filled with polymer upon cooling.

Preferably, after at least partially melting the polymer, the consolidated assembly is simply allowed to cool to room temperature. Alternatively, the assembly can be placed in a refrigerated environment to speed the cooling. The preferred cooling method is through forced air convection which can also be part of the thermal press. The press acts as a finned heat sink with an airflow passing through hollow passages in the press base and cooling the inductive coupler as it remains in the groove located in the base.

As an alternative to placing a liner and cap in the assembly, consolidation may be accomplished by infusion of a meltable polymer from outside the assembly. In this alternative embodiment, a thermal press is configured so as to feed a melted polymer into the assembly at a temperature and pressure sufficient to fill the spaces between the segments, the housing and the conductor. For example an injection molder can be used to pre-melt the polymer and then inject the melted polymer into the assembly under high pressures. The injection pressure will depend on the type of polymer used, its viscosity, and the size of the spaces between the segments, housing, and conductor. Another factor to consider in an injection molding process is the fragility of the MCEI segments and wire. The chosen injection pressure should not be high enough to break the segments or wire.

Figure 11:
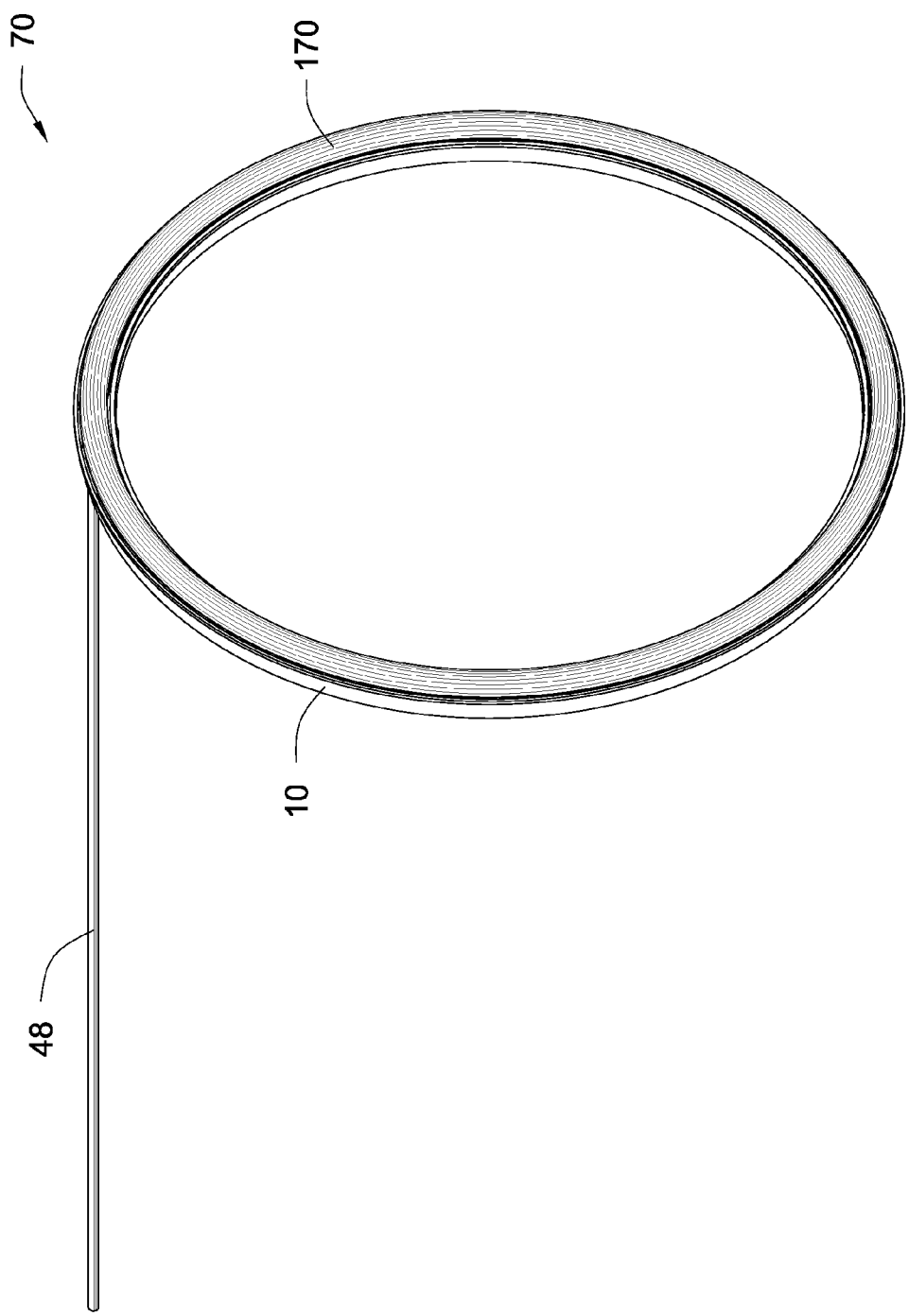
FIG. 11 is a perspective view illustrating the inductive coupler after final assembly and thermal press cycle.

FIG. 11 depicts the final product after the thermal press cycle. The inductive coupler 70 is consolidated with the circular, meltable polymer cap 170 adhering to the annular housing 10 and the second portion 48 of the insulated wire extending there from. The inductive coupler is then surface ground to a desired height prior to assembly within a downhole component.

Figure 12:
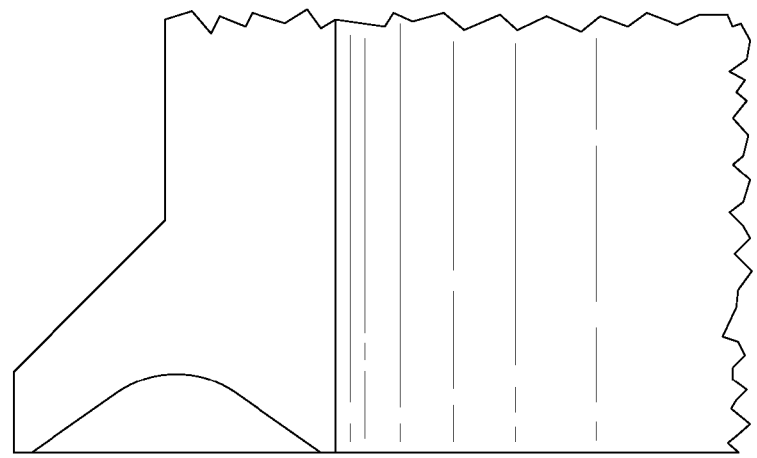
FIG. 12 is a cross sectional and perspective view of the thermal press disc.
Figure 13:
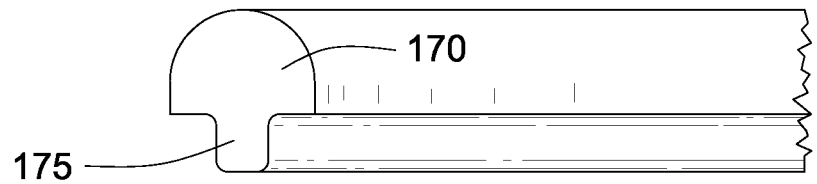
FIG. 13 is a cross sectional and perspective view of a circular, meltable polymer cap.

FIGS. 12–16 depict a cross sectional perspective view of the components used to assemble the inductive coupler as shown in FIG. 10. Essentially, these Figures depict an exploded cross sectional side view of the assembly. FIG. 12 illustrates one embodiment of the thermal press disc as shown in FIG. 8 and its possible underside contour. Other contours (not illustrated) are also suitable to match the shape of the circular, meltable polymer cap. FIG. 13 shows a cross sectional side view of the generally circular, meltable polymer cap 170 including the protrusion 175. The rounded edge opposite the protrusion 175 as shown in the drawing is not a necessary element for the polymer cap. This can be modified to various shapes and heights depending on the desired amount of material covering the top of the inductive coupler.

Figure 14:
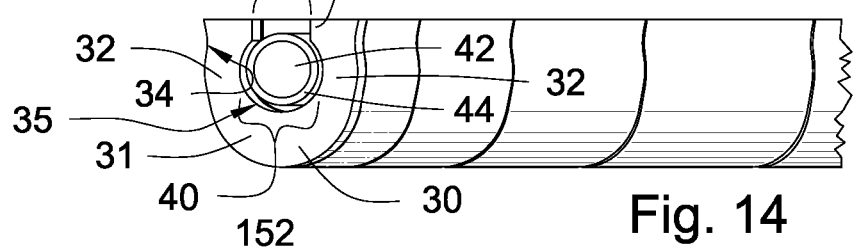
FIG. 14 is a cross sectional and perspective view of the MCEI segments and insulated wire.

FIG. 14 illustrates a cross sectional side view of the MCEI segments 30 including the insulated wire 40. The generally U-shaped MCEI segment 30 includes a bottom portion 31 and two opposing side portions 32 which portions together form a trough 35. The side portions include a groove 34 in its surface opposite the trough 35. In the most preferred embodiment, the two opposing side portions 32 comprise an overhang 33 extending toward but not reaching the other side portion, though it isn't necessary in all embodiments of the invention. Alternatively, the side portions may simply form a general U-shape with no overhangs extending there from. Within the U-shaped MCEI segments 30, an insulated wire 40 is provided to carry electrical current there through. The wire 42 of the insulated wire 40 is insulated with an insulating polymer 44. The overhang 33 serves to retain the insulated wire 40 within the MCEI segments 30. Preferably the trough 35 has an opening 37 that is narrower than the diameter of the conductor such as an insulated wire 40 as shown.

Figure 15:
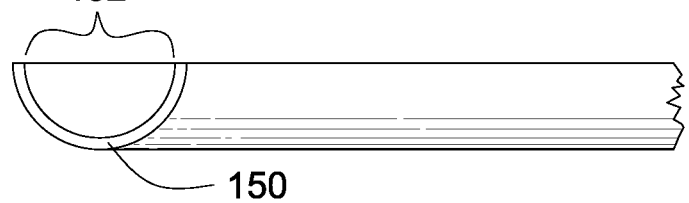
FIG. 15 is a cross sectional and perspective view of a liner.
Figure 16:
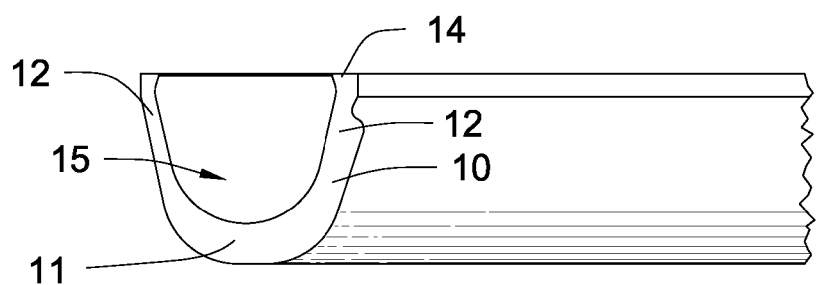
FIG. 16 is a cross sectional and perspective view of an annular housing.

FIG. 15 shows a cross sectional side view of the annular meltable liner 150 preferably including an open end 152. Turning to FIG. 16, shown is a cross sectional side view of the generally U-shaped annular housing 10 having a recess 15. The recess is defined by a bottom portion 11 and two opposing side wall portions preferably with each side wall portion comprising a lip extending toward, but not reaching the other side wall portion.

Figure 17:
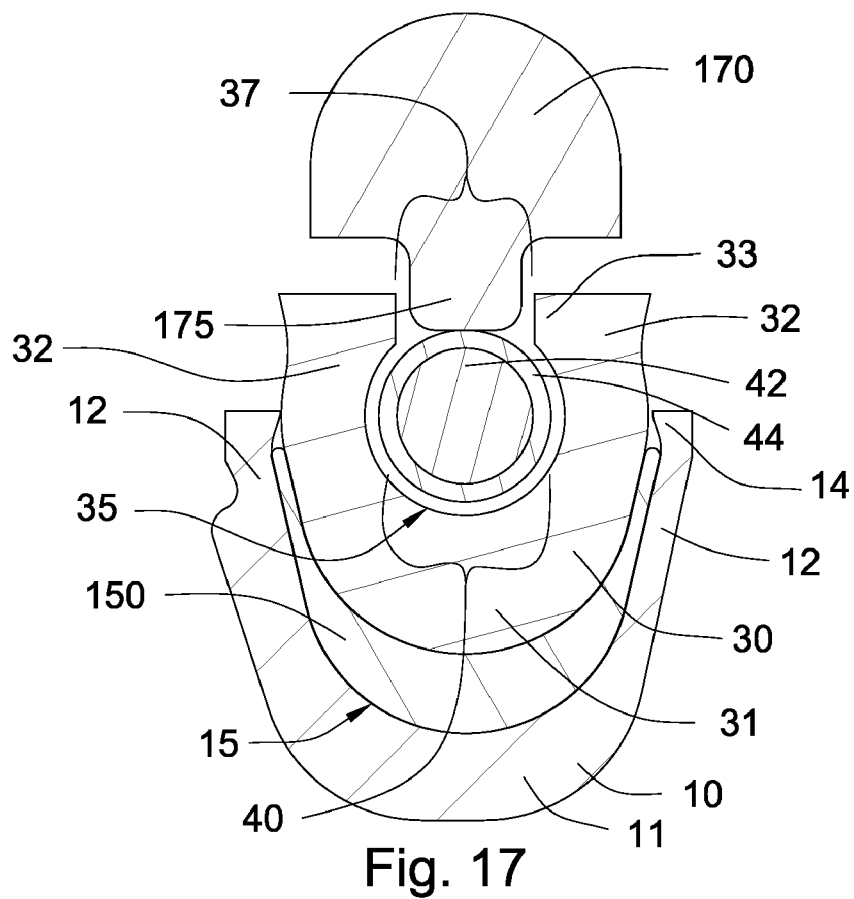
FIG. 17 is a cross sectional and side view of the final assembly before the thermal press cycle.
Figure 18:
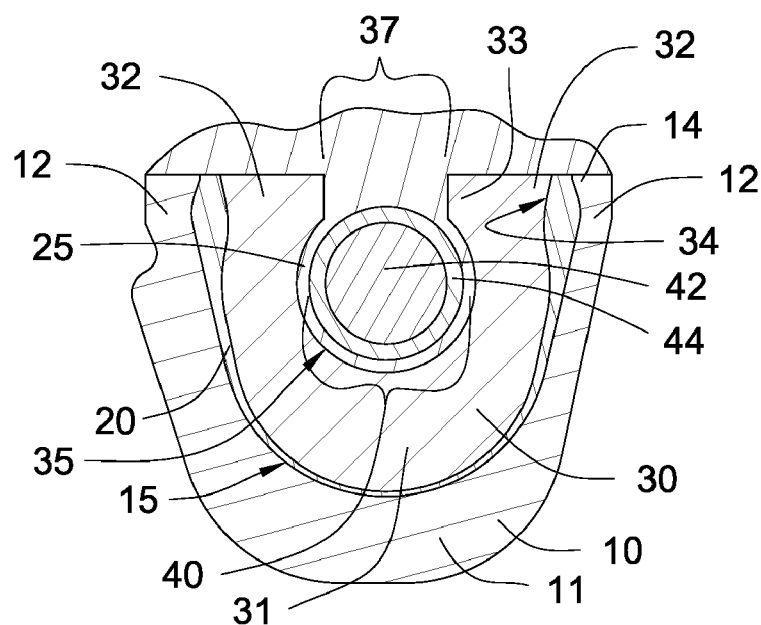
FIG. 18 is a cross-sectional and side view of an inductive coupler illustrating the placement of the MCEI segments, insulated wire, and polymer matrix formed from the cap and liner after the thermal press cycle within the annular housing.

FIGS. 17 and 18 depict a cross sectional side view of the assembly, both before and after the consolidation cycle respectively. FIG. 17 shows the stack up of all the components previously discussed in FIGS. 13–16. A generally U-shaped annular housing 10 has a recess 15 defined by a bottom portion 11 and two opposing side wall portions preferably with each side wall portion comprising a lip extending toward, but not reaching the other side wall portion. A meltable liner 150, preferably generally U-shaped, is placed in the recess 15. A plurality of generally U-shaped MCEI segments 30 are placed on top of the liner 150. The generally U-shaped MCEI segments 30 includes a bottom portion 31 and two opposing side portions 32 which portions together form a trough 35. The two opposing side portions 32 comprise an overhang 33 extending toward but not reaching the other side portion. Within the U-shaped MCEI segments 30, an insulated wire 40 is provided to carry electrical current there through. The wire 42 of the insulated wire 40 is insulated with an insulating polymer 44. The overhang 33 serves to retain the insulated wire 40 within the MCEI segments 30. Preferably the trough 35 has an opening 37 that is narrower than the diameter of the conductor such as an insulated wire 40 as shown. A circular, meltable polymer cap 170 is placed on top of the assembly where the protrusion 175 fits within the trough 35 and preferably contacts the insulated polymer 44 of insulated wire 40.

FIG. 18 shows a cross sectional side view of the assembly post the consolidation cycle and subsequent flow and deformation of the meltable, polymer liner and circular cap thereby infusing the assembly with the melted polymer. The numbering from the previous Figure depicts like components. The MCEI segments are aligned in the recess 15 to form a pocket between the grooves 34 on the side portions 32 and the annular housing 10. The formed pocket is preferably wider than the gap between the MCEI segments and the lip 14.

The meltable polymer liner and circular, meltable polymer cap are preferably constructed out of a polymer material that when melted, flows and bonds together consolidating the inductive coupler. The annular housing 10 and MCEI segments 30 are, subsequent the thermal press cycle, filled with a polymer 20 from the polymer liner such that the polymer fills spaces between the segments 30, annular housing 10, and the insulated wire 40. The polymer 20 forms a bulbous region the width thereof matching the pocket width.

A polymer 25 from the circular, meltable polymer cap and protrusion preferably affixes the insulated wire 40 within the generally U-shaped MCEI segment 30. The circular, meltable polymer cap preferably flows over the MCEI segments side portions 32 and annular housing side wall portions 12 thus adhering to the annular liner. As a result of the consolidating step, done preferably with a thermal press, the assembly is consolidated together forming the inductive coupler.

Both the meltable polymer liner and circular, polymer cap are made of polymer material. Various types of polymers can be employed in making the circular cap and meltable liner used to create the inductive coupler including those "filler materials" discussed above, most preferably they are made of FEP polymer, grade 6100.

Many types of data sources are important to management of a drilling operation. These include parameters such as hole temperature and pressure, salinity and pH of the drilling mud, magnetic declination and horizontal declination of the bottom-hole assembly, seismic look-ahead information about the surrounding formation, electrical resistivity of the formation, pore pressure of the formation, gamma ray characterization of the formation, and so forth. The high data rate provided by the present invention provides the opportunity for better use of this type of data and for the development of gathering and use of other types of data not presently available.

Whereas the present invention has been described in particular relation to the drawings attached hereto, it should be understood that other and further modifications apart from those shown or suggested herein, may be made within the scope and spirit of the present invention. It is therefore intended that the foregoing detailed description be regarded as illustrative rather than limiting, and that it be understood that it is the appended claims, including all equivalents, that are intended to define the spirit and scope of this invention.

What is claimed is:

1. An inductive coupler for downhole components, comprising:
    an annular housing having a recess defined by a bottom portion and two opposing side wall portions, at least one of the two side wall portions comprising a lip extending toward, but not reaching the other side wall portion;
    a plurality of generally U-shaped MCEI segments disposed within the annular housing to form a generally circular trough;
    a conductor disposed within the trough;
    a polymer filling spaces within the recess and between the MCEI elements and the conductor, and such that the lip functions to retain the MCEI elements within the recess.

2. The inductive coupler of claim 1 wherein the segments comprise a bottom portion and two opposing side portions, which portions together form a trough, and wherein at least one of the side portions includes at least one groove in its surface opposite said trough.

3. The inductive coupler of claim 2 wherein the MCEI segments are aligned in the recess to form a gap between the segments and the lip.

4. The inductive coupler of claim 3 wherein a pocket formed between the groove and the annular housing is wider than the gap.

5. The inductive coupler of claim 2 wherein each of the two opposing side portions comprise an overhang extending toward but not reaching the other side portion.

6. The inductive coupler of claim 1, wherein the polymer is thermoplastic.

7. The inductive coupler of claim 1, wherein the polymer is a fluoropolymer.

8. The inductive coupler of claim 7, wherein the fluoropolymer is chosen from the group consisting of PFA, FEP, ETFE, AF, PTFE, and ECTFE.

9. The inductive coupler of claim 1 wherein the polymer adheres to the annular housing.

10. The inductive coupler of claim 1, wherein the polymer adheres to the conductor.

11. The inductive coupler of claim 1, wherein the polymer does not adhere to the MCEI segments.

12. The inductive coupler of claim 1, wherein the trough has an opening that is narrower than the diameter of the conductor.

13. The inductive coupler of claim 1 wherein the conductor comprises a material selected from the group consisting of copper, copper clad steel, silver plated copper clad steel, nickel plated copper clad steel, copper clad stainless steel, silver plated copper clad stainless steel, and nickel plated copper clad stainless steel.

14. The inductive coupler of claim 1 wherein the conductor is wire insulated with an insulating polymer.

15. The inductive coupler of claim 14 wherein the insulating polymer is bonded to the wire.

16. The inductive coupler of claim 14 wherein the insulating polymer is thermoplastic.

17. The inductive coupler of claim 14, wherein the insulating polymer is a fluoropolymer.

18. The inductive coupler of claim 17 wherein the fluoropolymer is chosen from the group consisting of PFA, FEP, ETFE, AF, PTFE, and ECTFE.

19. The inductive coupler of claim 1 wherein the MCEI segments include a plurality of grooves on its outer surface.

20. The inductive coupler of claim 19 wherein the plurality of grooves act as barbs to retain the segments within the annular housing.

21. The inductive coupler of claim 1 wherein the MCEI segments comprise ferrite.

22. The inductive coupler of claim 1 wherein the annular housing is made of metal selected from the group consisting of steel, titanium, chrome, nickel, aluminum, iron, copper, tin, and lead, as well as alloys thereof.

23. The inductive coupler of claim 1 wherein the annular housing is made of a steel selected from the group consisting of viscount 44, D2, stainless steel, tool steel, and 4100 series steels.

24. The inductive coupler of claim 1 wherein an end of the conductor is electrically connected to the annular housing.

25. The inductive coupler of claim 24 wherein an end of the first portion of the conductor is attached to the annular housing by welding.

26. The inductive coupler of claim 24 wherein an end of the first portion of the conductor is attached to the annular housing by brazing.

* * * * *